April 9, 1929.  G. D. BRADSHAW  1,708,656
FLUID SEPARATOR
Filed Oct. 23, 1926   2 Sheets-Sheet 1

INVENTOR:
Grant D. Bradshaw
By E. J. Andrews
Att'y.

April 9, 1929.  G. D. BRADSHAW  1,708,656
FLUID SEPARATOR
Filed Oct. 23, 1926  2 Sheets-Sheet 2
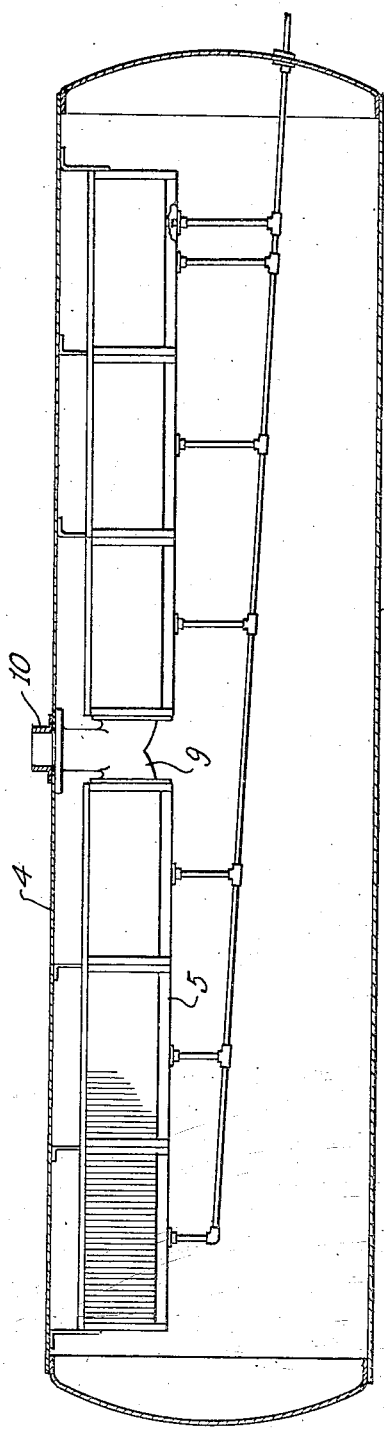
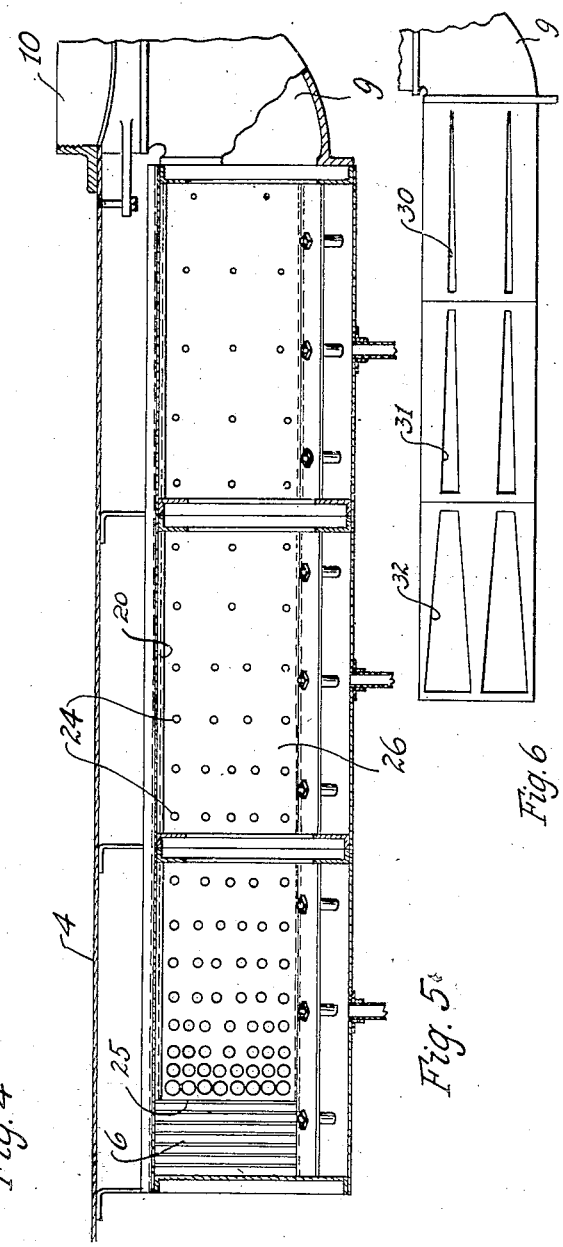
INVENTOR:
Grant D. Bradshaw
By E. J. Andrews
Atty.

Patented Apr. 9, 1929.

1,708,656

UNITED STATES PATENT OFFICE.

GRANT D. BRADSHAW, OF PITTSBURGH, PENNSYLVANIA, ASSIGNOR, BY MESNE ASSIGNMENTS, TO BLAW-KNOX COMPANY, OF BLAWNOX, PENNSYLVANIA, A CORPORATION OF NEW JERSEY.

FLUID SEPARATOR.

Application filed October 23, 1926. Serial No. 143,675.

This invention relates to fluid separators, and has for its object providing a fluid separator or purifier that can be used for drying or purifying gases, and is particularly adapted to the drying and purifying of steam. The general arrangement of the purifier is that of a well known type which is adapted to be inserted in a steam or gas generator and arranged so that the steam or gas will pass through drying and purifying baffles in the separator and then pass out to the ordinary gas main. One of the objects of the invention is to provide for distributing uniformly the flow of steam or gas through the purifying baffles so that each portion of the baffles may be fully effective. Other objects of the invention will be apparent from the following description and the accompanying drawings.

Figure 1:
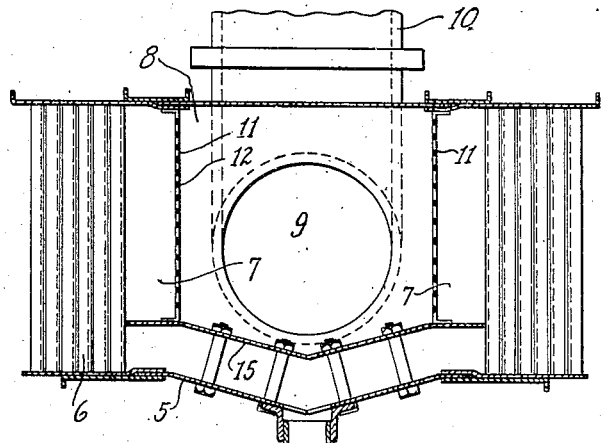
Figure 2:
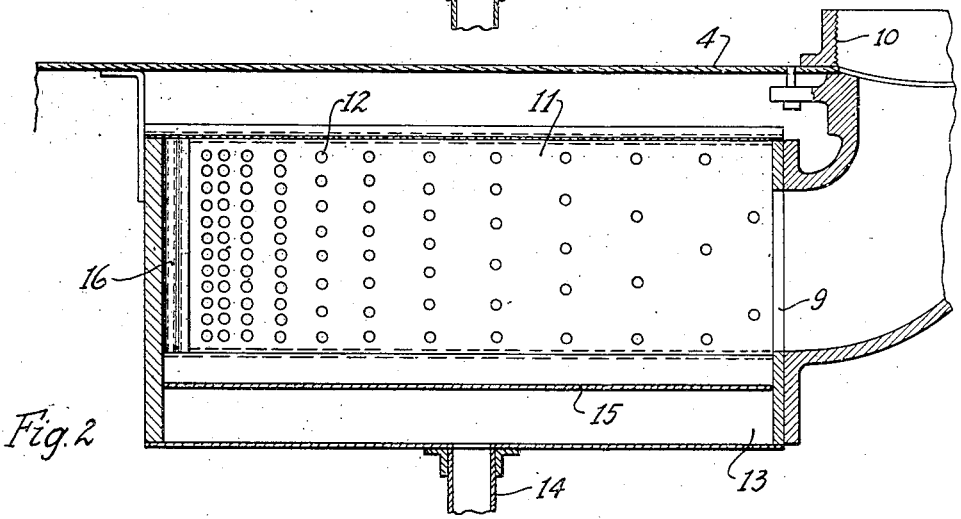
Figure 3:
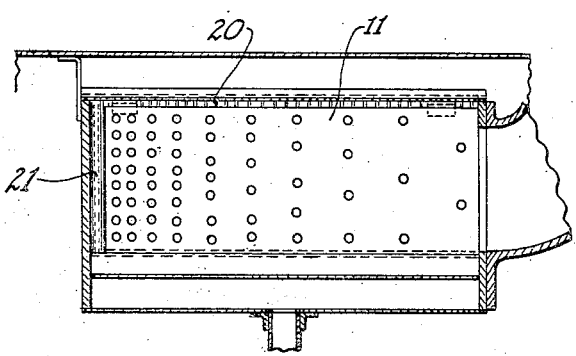

Of the drawings Fig. 1 is a transverse sectional elevation of a fluid separator which embodies the features of my invention; Fig. 2 is a longitudinal central sectional elevation of the separator as it appears when mounted in a gas generator; and Fig. 3 is a similar view, somewhat reduced, of a modified form of separator; Fig. 4 is an elevation of a series of separators mounted in a boiler; Fig. 5 is an enlarged sectional elevation of some of the separators of Fig. 4; and Fig. 6 shows a modified form of the separator of Fig. 5 reduced in scale.

For the purpose of illustrating my invention I will describe it as used in a steam boiler for drying and purifying the steam generated therein; but it is to be understood that the invention is applicable to various other uses, and that it may be applied to other types of separators than the one illustrated and described herein. Whenever an apparatus is used into which gas enters and then passes through any form of baffles or restricting means, the passage of the gas through the restricting means will not be uniformly distributed ordinarily, unless special means are provided therefor. This is particularly so in case of an elongated gas receiver, having its outlet at one end, or nearer certain portions of the baffles than other portions. There is a tendency in such a case for the gas to flow more readily through the portions nearer the outlet of the apparatus. The object of my invention is to provide suitable means for producing uniform distribution of the gas through such apparatus.

The apparatus illustrated herein comprises a well known type of fluid separator called by the trade the "Tracyfier". The separator has a casing 5, in the sides of which are mounted a series of purifying baffles 6. The apparatus is suitably mounted in a boiler 4. The steam generated in the boiler passes into the separator along the sides thereof and through the baffles and into the chamber 7, and ultimately out of the boiler through the outlet 9, to the steam main 10. In cases of this nature, where the outlet is at one end of the casing, and the steam is at liberty to flow in through the entire length of the sides, the flow through the baffles nearest the outlet is ordinarily much greater than at more remote points. As a consequence the remote baffles are not fully effective. I, therefore, provide means for resisting the flow of steam more and more as the outlet end of the separator is approached. For this purpose I provide partitions 11 mounted between the chambers 7 and 8. And in these plates I provide openings 12. As a consequence, the steam in its passage from the baffles to the outlet passes through these openings. By decreasing the number or size of the openings, as indicated, as the outlet is approached, I restrict more and more the flow of steam through the end of the partitions nearest the outlet, thus reducing the tendency of the steam to flow through the baffles adjacent the outlet end. And, by properly proportioning the number or the size of these openings 12, the flow of the steam is made uniform throughout the baffles.

In order to properly distribute the steam the aggregate cross section of the openings, as the closed end of the separator is approached, must increase in a much greater proportion than the distance from the end of the baffles at the outlet end. For this reason, in this particular case, I increase the number of openings at a much greater rate than the increase in distance from the outlet. But it is to be understood that the size of the openings could be increased if desired to accomplish this same purpose. Also, to properly distribute the steam it is desirable to have the partition 11 end before it reaches the closed end of the separator, and thus to provide an unobstructed opening 16 between the two chambers 7 and 8. Substantially the same end may be brought about by increasing the number of openings, but I prefer to insert partitions 11 somewhat shorter than the length of the casing, as indicated.

For certain reasons it is desirable in some cases to have freer passage of the steam from the chambers 7 and 8 near the upper portion of the separator. For instance, this has a tendency to draw more steam from the upper portion of the boiler, and thus from the drier portions of the steam. Because of this I provide, in some instances, a slot 20 extending along the upper portion of the partition 11 through which the steam is free to pass. That is, in such cases, I provide a partition which is not only shorter but is lower than the dimensions of the passageways 7 and 8, thus providing the unobstructed openings 20 and 21. At the same time I properly distribute the openings through the partitions for the reasons already stated.

It is common in practice to install in boilers, gas producers, and other gas manipulating apparatus, a series of separators, as indicated in Figs. 4 and 5. When so installed it is even more desirable to have means for properly distributing the flow of the gas through all of the separators, as, owing to the length of the series, the baffles most remote from the outlet are at a much greater disadvantage over those near the outlet. Hence, it is desirable to provide gas retarding means that will properly distribute the gas not only in each separator but also throughout the entire series.

For this purpose I increase the number or the size of the holes 24, gradually from the outlet to the outer ends of the series. And I also increase materially the size of the end opening 25. Inasmuch as the inner chamber 26 is open continuously from one end of the series to the other, each series of separators on either side of the outlet act as a single separator, and if the openings are as indicated the gas distribution through the baffles will be uniform throughout the entire length of the series. Openings of any other shape may be made in the plates 11. For instance tapering openings or slots 30, 31 and 32 may be used. Preferably these slots extend the full length of the sections and two or more are made in each plate. As the sections recede from the outlet 9, the slots increase in width, and the rate of increase in width of each slot is greater than the slots nearer the outlet. By having two or more slots vertically, the gas distribution vertically through the baffles is made more uniform.

I claim as my invention:

1. A fluid separator comprising an elongated casing having an inlet in one side and having an outlet adjacent one end, said separator having a partition extending longitudinally therein between the inlet and the outlet, said partition having a plurality of openings therethrough, the openings decreasing in cross section as the outlet end of the separator is approached.

2. A fluid separator comprising an elongated casing having an inlet in one side and having an outlet adjacent one end, said separator having a partition extending longitudinally therein between the inlet and the outlet, said partition having a plurality of openings therethrough, the openings decreasing in cross section as the outlet end of the separator is approached, the said partition terminating a material distance from the end of the casing most remote from the outlet.

3. A fluid separator comprising an elongated casing having an inlet in one side and having an outlet adjacent one end, said separator having a partition extending longitudinally therein between the inlet and the outlet, said partition having a plurality of openings therethrough, the openings decreasing in cross section as the outlet end of the separator is approached, the said partition terminating a material distance from the end of the casing most remote from the outlet, and said partition terminating before the top of the casing is reached, whereby a slot extends substantially the length of the partition between the partition and the wall of the casing.

4. A fluid separator comprising an elongated casing having an inlet in one side and having an outlet adjacent one end, said separator having a partition extending longitudinally therein between the inlet and the outlet, said partition having a plurality of openings therethrough, the aggregate cross section of the openings per unit of length decreasing as the outlet end of the separator is approached, the aggregate cross section of the openings decreasing at a greater rate than the increase in distance from the remote end of the separator.

5. In a fluid separator a casing, having an inlet and an outlet, a plurality of baffles mounted between said inlet and outlet, and a partition in said casing between said baffles and said outlet, said partition having a plurality of unequally spaced openings therethrough and being farther apart as the outlet of the separator is approached.

6. A fluid separator comprising a plurality of sections of separators connected in series, having an outlet at one end, baffles along one side of each separator section, and gas retarding means mounted between the baffles and the outlet, said means comprising a plate mounted in each section, said plate having a plurality of openings therethrough, the openings per unit of length in each plate increasing in aggregate cross section as the outlet is receded from, and the aggregate cross section of the openings in each plate being greater than that of the adjacent plate nearer the outlet.

7. A fluid separator comprising an elongated casing having an inlet in one side and having an outlet remote from one end, said separator having a partition extending longitudinally therein between the inlet and the outlet, said partition having a plurality of openings therethrough, the openings increasing in cross section per unit of length as the outlet of the separator is receded from.

In testimony whereof, I hereunto set my hand.

GRANT D. BRADSHAW.